(12) United States Patent
Miyashita (10) Patent No.: US 10,582,094 B2
(45) Date of Patent: Mar. 3, 2020

(54) CAMERA MOUNT STAND AND COVER

(71) Applicant: GoPro, Inc., San Mateo, CA (US)

(72) Inventor: Yusuke Miyashita, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 652 days.

(21) Appl. No.: 15/272,326

(22) Filed: Sep. 21, 2016

(65) Prior Publication Data

US 2018/0084160 A1    Mar. 22, 2018

(51) Int. Cl.
| | |
|---|---|
| *H04N 5/225* | (2006.01) |
| *G03B 17/56* | (2006.01) |
| *G03B 11/04* | (2006.01) |
| *G03B 17/04* | (2006.01) |

(52) U.S. Cl.
CPC .......... *H04N 5/2252* (2013.01); *G03B 11/04* (2013.01); *G03B 17/04* (2013.01); *G03B 17/56* (2013.01); *G03B 17/561* (2013.01)

(58) Field of Classification Search
CPC ............. H04N 5/2252; H04N 5/23216; H04N 5/23245; G03B 17/561; G03B 17/56; G03B 11/04; G03B 17/04; G03B 17/02
See application file for complete search history.

(56) References Cited

U.S. PATENT DOCUMENTS

| | | | | |
|---|---|---|---|---|
| 8,199,251 B2* | 6/2012 | Woodman | .............. | G03B 17/02 |
| | | | | 348/375 |
| 8,837,928 B1* | 9/2014 | Clearman | .............. | G03B 17/08 |
| | | | | 396/25 |
| 9,282,226 B2* | 3/2016 | Samuels | ................ | G03B 17/02 |
| 9,751,471 B2* | 9/2017 | Schutz | .................... | B60R 11/04 |

* cited by examiner

*Primary Examiner* — Luong T Nguyen
(74) *Attorney, Agent, or Firm* — Young Basile Hanlon & MacFarlane, P.C.

(57) ABSTRACT

A camera housing can be configured as both a protective housing and a stand for a camera. The camera housing includes a housing body, an arm component, and a lid component. The housing body partially encloses the camera and exposes a lens of the camera. A first end of the arm component is coupled to the housing body via a first hinge, and a second end is coupled to the lid component via a second hinge. The arm component includes over-molded components configured to limit rotation of the arm component relative to the housing body and the lid component. In a folded configuration, the lid component reciprocally mates to the housing body to cover the camera lens. In an unfolded configuration, the arm component and the lid component are rotated away from the housing body, acting as a stand for the housing body.

21 Claims, 6 Drawing Sheets

CAMERA MOUNT STAND AND COVER

BACKGROUND

Technical Field

This disclosure relates to cameras, and more specifically, to a housing for a camera.

Description of the Related Art

Digital cameras are increasingly used in outdoors and sports environments. A user may set up a digital camera to capture images and/or video using a camera mount to position the digital camera in a desired orientation. Typically, camera mounts may be a type of tripod, monopod, or quadropod, which can be heavy and unwieldy to transport. Carrying a digital camera and a camera mount may not be practical for situations in which the user is constantly moving, needs to capture images and/or video quickly, or is unable to carry large camera equipment. A compact camera with a protective housing that is configured to act as a camera stand may provide convenience to a user, allowing the user to easily carry, mount, or position the camera to capture the perfect image and/or video.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview Configuration

In one embodiment, a camera housing is capable of acting as both a protective housing for a camera and as a camera stand for the camera. The camera housing includes a housing body, an arm component, and a lid component. The housing body comprises an opening within a first face of the housing body and a cavity extending from the opening into the housing body. The cavity is structured to at least partially enclose a camera such that when the camera is enclosed within the housing body, a lens of the camera is exposed within the opening. The arm component couples the housing body to the lid component. A first end of the arm component is coupled to an edge of a bottom surface of the housing body via a first hinge. The first end of the arm component comprises a first over-molded component configured to, when the arm component is rotated at least a threshold angle away from the bottom surface of the housing body, secure the arm component at the threshold angle relative to the housing body. A second end of the arm is coupled to an edge of the lid component via a second hinge. The second end of the arm component comprises a second over-molded component configured to, when the lid component is rotated to within a threshold angle towards the arm component, secure the lid component at the threshold angle relative to the arm component. The lid component is further configured to reciprocally mate with the first face of the housing body such that the lid component covers the opening (and thus, the lens of the camera) when the arm component is in a folded configuration.

Example Camera System and Camera Controller Configuration

Figure 1A:
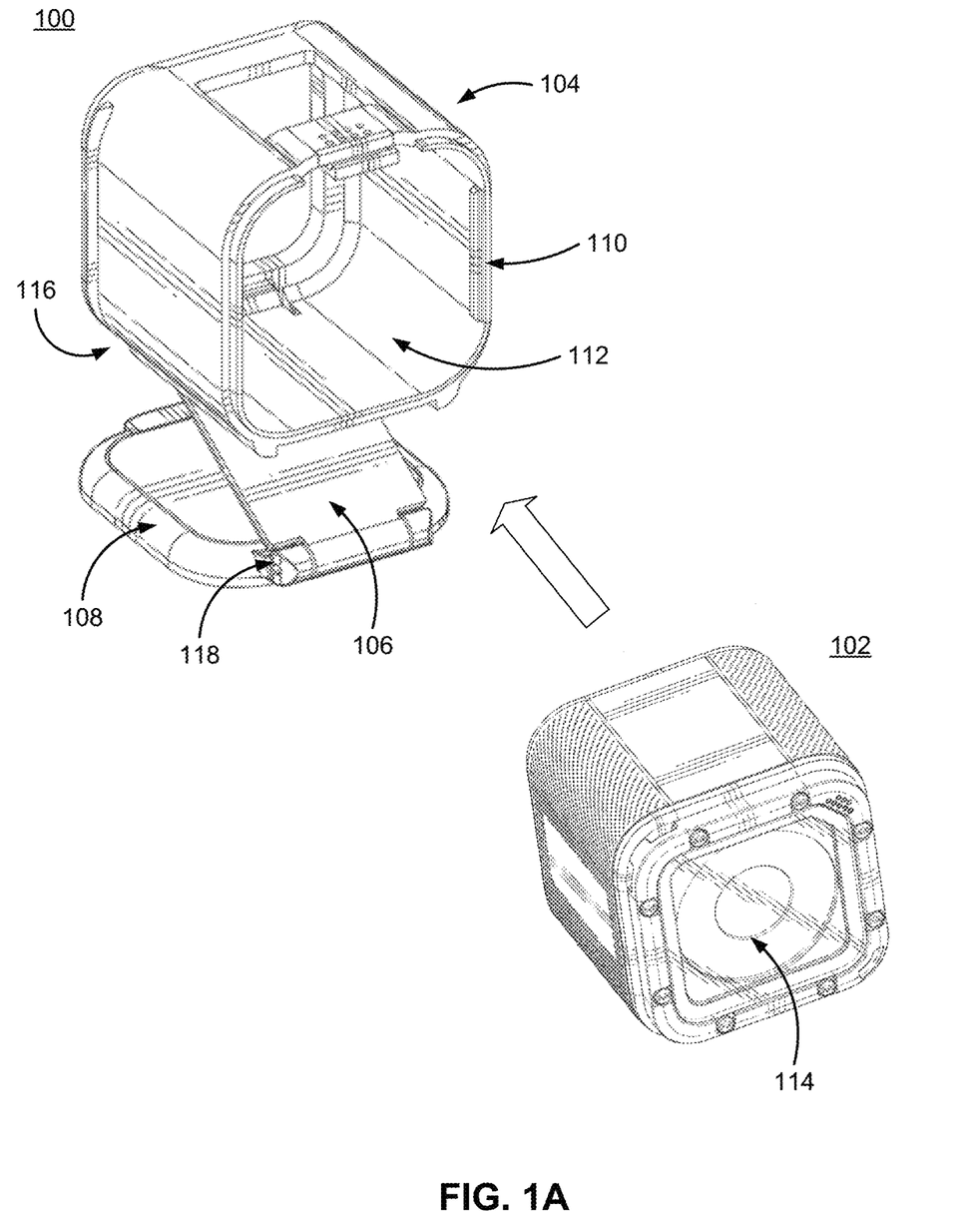
FIG. 1A illustrates a perspective view of a camera mount stand and cover in an unfolded configuration, according to one example embodiment.
Figure 1B:
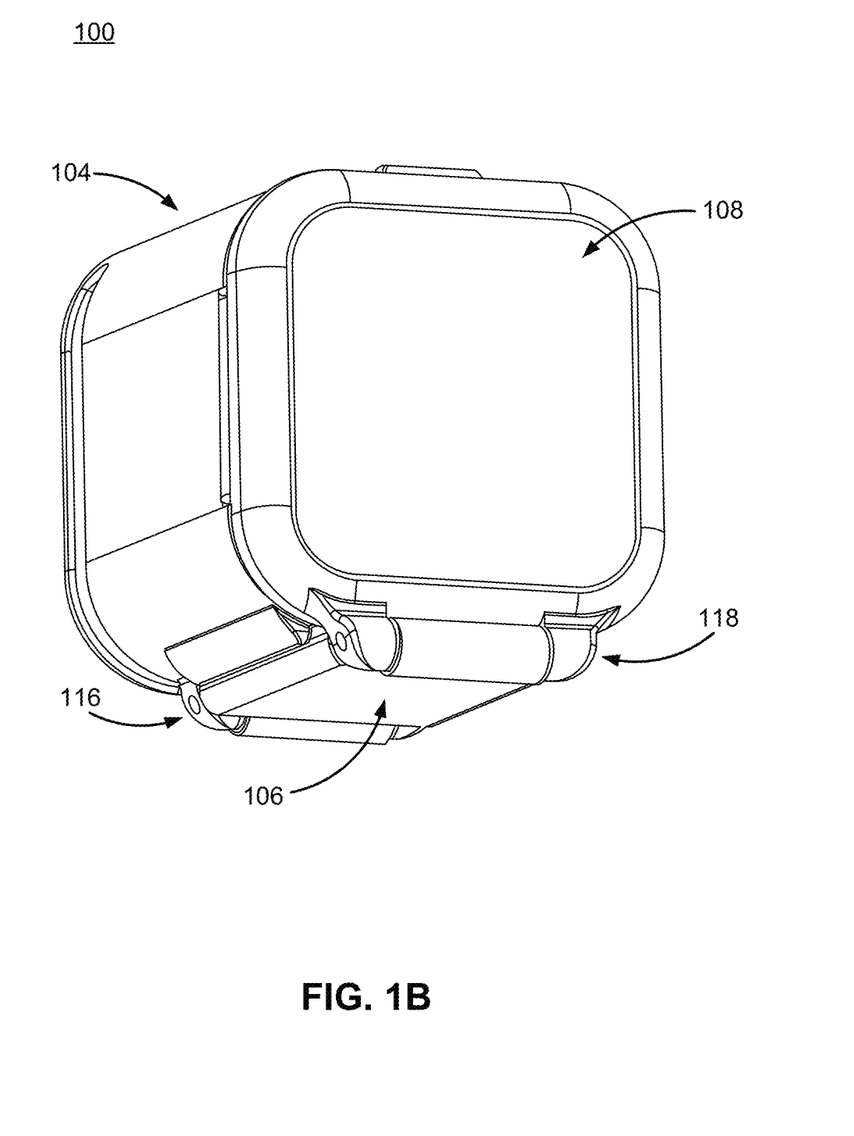
FIG. 1B illustrates a camera mount stand and cover in a folded configuration, according to one example embodiment.

FIG. 1A illustrates a perspective view of a camera mount stand and cover in an unfolded configuration, and FIG. 1B illustrates a camera mount stand and cover in a folded configuration, according to one example embodiment. The camera mount stand and cover 100, hereinafter referred to as camera mount 100, is configured to enclose an image capture device, such as example camera 102. In an unfolded configuration, as illustrated in FIG. 1A, the camera mount 100 is configured to act as a camera stand, allowing the camera 102 to be positioned for image and/or video capture. In a folded configuration, as illustrated in FIG. 1B, the camera mount 100 is configured to act as a protective housing for the camera 102. The camera mount 100 comprises a housing body 104, an arm component 106, and a lid component 108.

The housing body 104 is configured to partially enclose the camera 102. As illustrated in FIG. 1A, the housing body 104 comprises an opening 110 and a cavity 112. The opening 110 is located on a first side of the housing body 104 and is structured as substantially square-shaped with rounded corners. In the embodiment of FIGS. 1A and 1B, the opening 110 complements the geometry of the camera 102 such that the camera 102 may be inserted into the opening. The cavity 112 extends from the opening 110 and is substantially cube-shaped with rounded edges, structured to complement the geometry of the camera 102. This configuration allows the camera 102 to be inserted through the opening 110 and inserted into the cavity 112. When the camera 102 is fully inserted into the cavity 112, the housing body 104 encloses four sides of the camera 102, securing the camera 102 within the cavity 112. Other embodiments of the housing body 104 may enclose two, three, five, or six sides of the camera 102. In the embodiment of FIGS. 1A and 1B, the camera 102 is oriented within the cavity 112 such that the lens 114 of the camera 112 faces out of the opening 110. The housing body 104 may be composed of rigid materials (e.g. metals or hard plastics), flexible materials, or any other suitable material.

The arm component 106 couples the housing body 104 to the lid component 108. The arm component 106 can be substantially rectangular-shaped, wherein the length is approximately the length of the housing body 104. In the embodiment of FIGS. 1A and 1B, a first end of the arm component 106 is pivotally coupled to a bottom surface of the housing body 104 via a first hinge 116. The first hinge 116 may be capable of rotating the arm component 106 relative to the bottom surface of the housing body 104, such that the arm component 106 may be positioned against the bottom surface of the housing body 104 or the arm component 106 may be rotated away from the bottom surface the housing body 104. A second end of the arm component 106 is pivotally coupled to an edge of the lid component 108 via a second hinge 118. The second hinge 118 may be capable of rotating the lid component 108 relative to the arm component 106. This configuration of the arm component 106 allows for the rotation of the lid component 108 relative to the housing body 104 and relative to the arm component 106. The arm component 106 may be composed of rigid materials (e.g. metals or hard plastics), flexible materials, or any other suitable material.

The lid component 108 is configured to act as a cover for the lens 114 of the camera 102 when the camera 102 is enclosed by the housing body 104. In the embodiment of FIGS. 1A and 1B, the lid component 108 is substantially square-shaped with rounded corners, such that the lid component 108 complements the shape of the opening 110. The lid component 108 may be composed of rigid materials (e.g. metals or hard plastics), flexible materials, or any other suitable material. The lid component 108 is capable of securely coupling with the edges surrounding the opening 110. When the camera 102 is enclosed by the housing body 104, the lid component 108 can securely couple with the edges of the opening 110 around the lens 114 of the camera, thereby protecting the lens from contact with exterior sources. An edge of the lid component 108 is secured to the second end of the arm component 106 via the second hinge 118. The second hinge may be capable of rotating the lid component 108 relative to the arm component 106, such that the lid component 108 may be positioned to cover the opening 110 or may be rotated away from the opening 110. When rotation of the lid component 108 is coupled with the rotation of the arm component 106, the camera mount 100 may transition between the folded configuration (the lid component 108 coupling to the edge of the opening 110 and enclosing the camera lens 114) and the unfolded configuration (the lid component acting as a base for the camera mount 100).

In the folded configuration, the camera mount 100 acts as a protective housing for the camera 102, as illustrated in FIG. 1B. In the folded configuration, the arm component 106 is positioned against the bottom surface of the housing body 104 such that the arm component 106 is substantially flat against the housing body 104. The lid component 108 is rotated upwards and over the opening 110. The lid component 108 may have a securing interface (such as a latch) that reciprocally mates with a securing interface at the opening 110, thereby securing the lid component over the opening 110 unless an unlocking force is applied to the lid component, until a user manually releases the securing interface. This folded configuration protects the lens 114 and the overall camera 102 and may allow a user to conveniently carry and transport the camera 102.

In the unfolded configuration, the camera mount 100 is configured to act as a camera stand. As illustrated in FIG. 1A, the arm component 106 is rotated away from the bottom surface of the housing body 104, and the lid component 108 is rotated away from the opening 110. In the embodiment of FIGS. 1A and 1B, the first hinge 116 and the second hinge 118 may each have a locking mechanism that allows each hinge to lock into a specific position when rotated to a threshold angle, securing the housing body 104 at a threshold height above the lid component 108 and allowing the housing body 104, the arm component 106, and the lid component 108 to securely maintain their orientation to each other in the unfolded configuration. This unfolded configuration allows the lid component 108 to act as a base for the camera mount 100 and the arm component 106 to elevate and support the housing body 104, enabling a user to place the camera 102 in a desired position to capture images and/or videos.

To transition from the folded configuration to the unfolded configuration, the lid component 108 is rotated away from the opening 110 to expose the lens 114 and the arm component 106 is rotated away from the bottom surface of the housing body 104 until the first hinge 116 and the second hinge 118 are rotated to the threshold angle. To transition from the unfolded configuration to the folded configuration, the arm component 106 and the lid component 108 may be rotated in the opposite direction, towards the housing body 104, such that the arm component 106 is positioned against the bottom surface of the housing body 104 and the lid component 108 is secured to the housing body 104 to cover the opening 110.

Figure 2A:
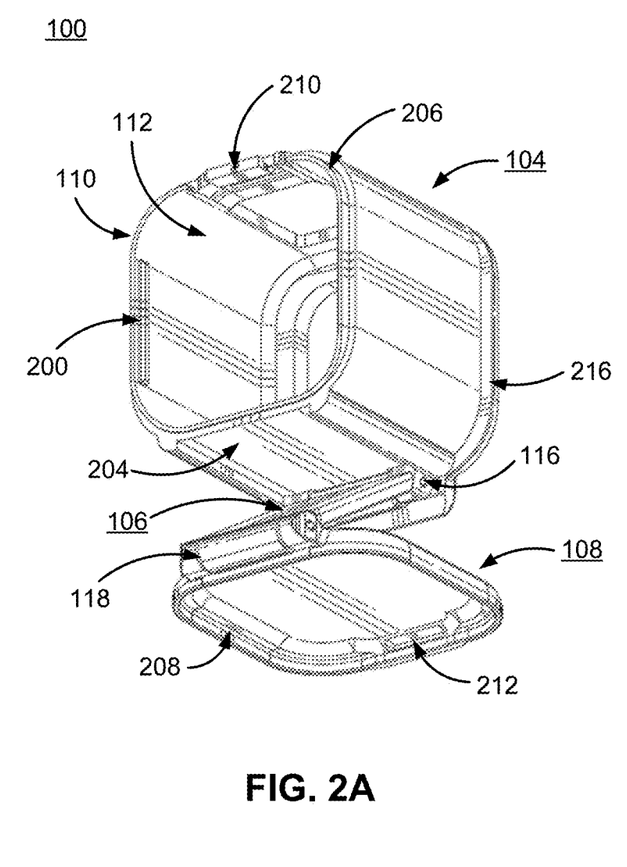
FIGS. 2A and 2B illustrate multiple perspective views of the camera mount stand and cover, according to one example embodiment.
Figure 2B:
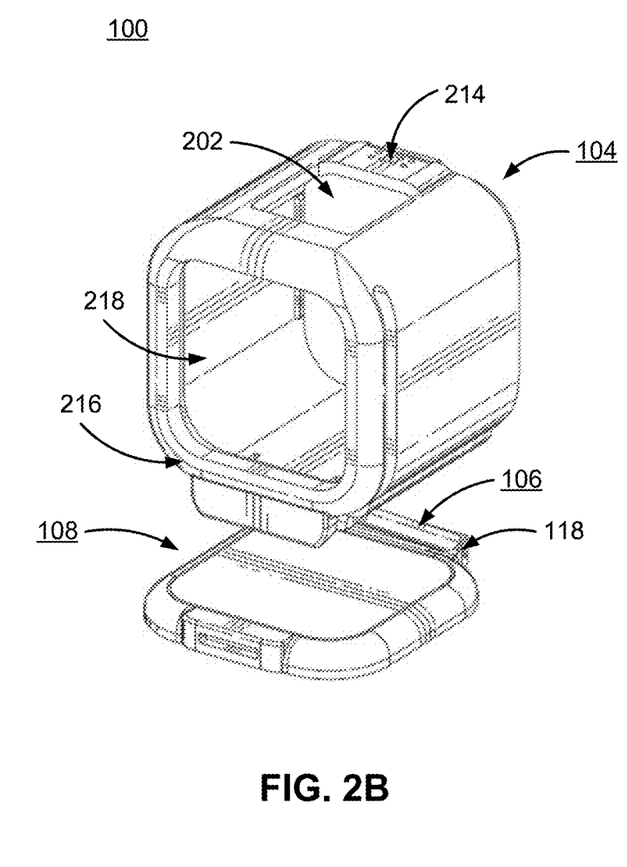

FIGS. 2A and 2B illustrate multiple perspective views of the camera mount stand and cover, according to one example embodiment. In the embodiments of FIGS. 2A and 2B, the camera mount 100 includes a plurality of securing protrusions 200, an opening 202, a recess 204, a mating interface 206, a reciprocal mating interface 208, a latch 210, a notch 212, a quick-release button 214, and a securing tab 216.

The plurality of securing protrusions 200 are configured to secure the camera 102 within the cavity 112. Each securing protrusion 200 is a rectangular-shaped protrusion that is located on an inner surface of the cavity 112 at the edge of the cavity 112 closest to the opening 110. In the embodiment of FIGS. 2A and 2B, a securing protrusion 200 is located at the right edge and at the left edge of the cavity 112, wherein each is structured to protrude from the inner surface of the cavity 112. This configuration may prevent the camera 102 from sliding out of the opening 110 after the camera 102 is inserted into the cavity 112. In some embodiments, the shape of the securing protrusion 200 may vary, e.g. cylindrical, circular, or any other geometric structure, or may comprise a plurality of ridges or bumps. In some embodiments, the securing protrusion 200 may be capable of flexing outwards to allow the camera 102 to be released from the cavity 112 or may be coupled to a release mechanism that may cause each securing protrusion 200 to retract and allow the camera 102 to be removed from the cavity 112.

The opening 202 is configured to expose a plurality of control buttons on the camera 102. In the embodiment of FIGS. 2A and 2B, the opening 202 is located on a top surface of the housing body 104. The plurality of control buttons may be to power on and off the camera, to begin or end image or video capture, to adjust camera settings, or to control any other function that a camera may be capable of performing. In some embodiments, the opening 202 may vary in shape, e.g., rectangular, circular, elliptical, or any other geometric shape. In some embodiments, the opening 202 may be configured as a control interface, rather than an opening, that is capable of controlling the plurality of control buttons of the camera 102.

The recess 204 is configured to receive and at least partially enclose the arm component 106 when the camera mount 100 is in the folded configuration. In the embodiment of FIGS. 2A and 2B, the recess 204 is a rectangular-shaped recess on the bottom surface of the housing body 104. As previously described, in the folded configuration, the arm component 106 is positioned against the bottom surface of the housing body 104, which allows the lid component 106 to rotate to cover the opening 110, such that the camera mount 100 acts as a protecting housing for the camera 102. The arm component 106 is enclosed within the recess 204 to enable the folded configuration. The recess 204 may help to maintain alignment of the arm component 106 in the folded configuration.

The mating interface 206 is configured to couple to the reciprocal mating interface 208 when the camera mount 100 is in the folded configuration. In the embodiment of FIGS. 2A and 2B, the mating interface 206 is located on the housing body 104, and the reciprocal mating interface 208 is located on the lid component 106. The mating interface 206 surrounds the opening 110 and protrudes outwards from the housing body 104 and perpendicular to the opening 110. The reciprocal mating interface 208 is a ridge located on an inner surface of the lid component 108 that surrounds the perimeter of the inner surface of the lid component 108. The shape of the mating interface 206 complements the shape of the reciprocal mating interface 208, such that the two components securely abut when the lid component 108 covers the opening 110. The mating interface 206 and the reciprocal mating interface 208 may help to maintain alignment of the lid component 108 in the folded configuration.

The latch 210 and the notch 212 are configured to secure the lid component 108 to the housing body 104 when the camera mount 100 is in the folded configuration. In the embodiment of FIGS. 2A and 2B, the latch 210 spans the top edge of the opening 110 and protrudes outwards away from the housing body 104. The latch 210 is structured as a protrusion that includes an outer protrusion at an end of the protrusion. The notch 212 is located along an edge on the inner surface of the lid component 108. The latch 210 is configured to mate with the notch 212 of the lid component 108, such that the outer protrusion of the latch 210 is secured within the notch 212. This configuration prevents the lid component 108 from rotating away from the housing body 104 in the folded configuration. In some embodiments, the latch 210 may vary in structure, given that a portion of the latch 210 is configured to be secured within the notch 212. In some embodiments, securing mechanisms such as screws, a press-fit, flexible securing components, or any other suitable securing mechanism may be used to secure the lid component 108 to the housing body 104 in the folded configuration.

The quick-release button 214 is configured to release the lid component 108 from the housing body 104 in the folded configuration. In the embodiment of FIGS. 2A and 2B, the quick-release button 214 is located on a top surface of the housing body 104, extending from the latch 210 to the opening 202. The quick-release button 210 is coupled to the latch 210 and controls the release of the latch 210 from the notch 212. When depressed, the quick-release button causes the latch 210 to flex such that the outer protrusion of the latch 210 slips out of the notch 212 and thus releases the lid component 108 from the housing body 104. A user may depress the quick-release button 210 to expose the lens 114 of the camera 102 and/or to transition the camera mount 100 from the folded configuration to the unfolded configuration. The quick-release button 210 may include a plurality of ridges, notches, and/or a varying material, which may provide tactile recognition to a user.

The securing tab 216 is configured to allow the camera mount 100 to be secured or mounted to a user or an object. In the embodiment of FIGS. 2A and 2B, the securing tab 216 is located on a second side of the housing body 104 that is opposite of the opening 110. The securing tab 216 is substantially square-shaped, such that the geometry complements the shape of the housing body 104. The securing tab 216 can be a hanging clip that is attached to the housing body 104 at the top edge of the securing tab 216 and housing body 104, such that there is a gap between the securing tab 216 and the housing body 104 that allows a user to slide an object into the gap. The object may be a belt, a belt loop, a backpack strap, a pocket, a waistband, or any other object that may fit into the gap between the securing tab 216 and the housing body 104. In the embodiments of FIGS. 2A and 2B, the securing tab 216 further includes an opening 218 in the center.

The opening 218 may provide access to the back side of the camera, which may allow a user to look through a viewfinder of the camera. In the embodiment of FIGS. 2A and 2B, the securing tab 216 further includes a protruding tab along the bottom edge of the securing tab 216. A first portion of the protruding tab protrudes towards the housing body 104, such that the distance of the gap between the securing tab 216 and the housing body 104 is decreased. This configuration may help to further secure the securing tab 216 onto the desired object. A second portion of the protruding tab protrudes outwards from the bottom edge of the securing tab 216 and perpendicular to the housing body 104. This configuration may allow a user to push against the protruding tab to flex the securing tab 216 away from the housing body 104 and allow the user to release the camera mount 100 from the desired object. In some embodiments, the shape and structure of the securing tab 216 may vary. For example, the securing tab 216 may be customized for attachment to various types of camera mounts.

Figure 3A:
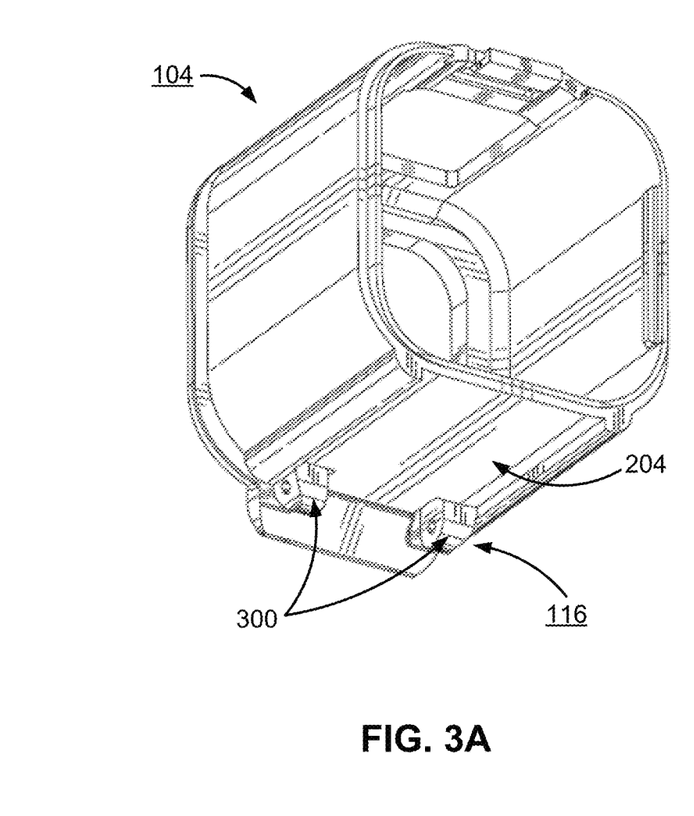
FIGS. 3A and 3B illustrate multiple perspective views of a housing component and a lid component of the camera mount stand and cover, according to one example embodiment.
Figure 3B:
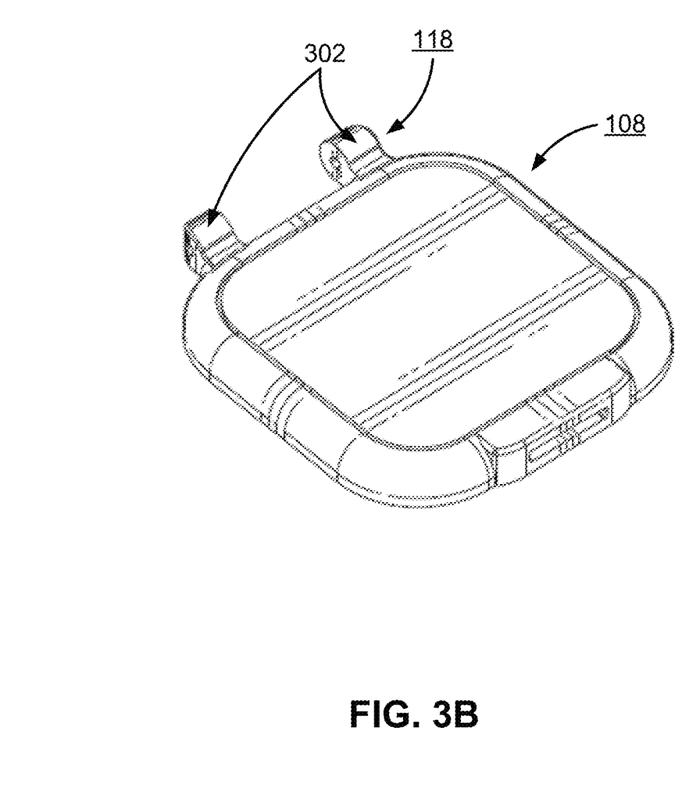

FIGS. 3A and 3B illustrate multiple perspective views of a housing component and a lid component of the camera mount stand and cover, according to one example embodiment. FIG. 3A illustrates the bottom surface of the housing body 104 which includes the recess 204, as described with regards to FIGS. 2A and 2B, and a knuckle 300 of the first hinge 116. In the embodiment of FIG. 3A, the knuckle 300 is located within the recess 204 at an end closest to the securing tab 216. The knuckle 300 is structured as two protrusions that protrude outwards and away from the housing body 104. The two protrusions are spaced apart to receive a leaf of the first hinge 116 that is located at a first end of the arm component 106. In the embodiment of FIG. 3A, each protrusion includes a cylindrical bore on a side of the protrusion. The cylindrical bores are positioned opposite each other and aligned such that the cylindrical bores may receive a pin of the first hinge 116, wherein the pin is configured to also pass through a tunnel of the leaf of the arm component 106, thereby rotatably securing the arm component 106 to the housing body 104. This configuration of the first hinge 116 allows the arm component 106 to rotate relative to the housing body 104. In some embodiments, the first hinge 116 may include more than two protrusions.

FIG. 3B illustrates the edge of the lid component 108 which includes a knuckle 302 of the second hinge 118. In the embodiment of FIG. 3B, the knuckle 302 is located on an edge of the lid component 108 that is opposite of the edge including the notch 212. Similar in structure and function to the knuckle 300, the description of the knuckle 300 may be incorporated herein for the knuckle 302. In the embodiment of FIG. 3B, the knuckle 302 is structured as two protrusions spaced apart to receive a leaf of the second hinge 118 that is located at a second end of the arm component 106. Each protrusion includes a cylindrical bore, wherein the cylindrical bores are aligned to receive a pin of the second hinge 118 that also passes through a tunnel of the leaf of the second hinge 118, thereby rotatably securing the lid component 108 to the arm component 106. This configuration of the second hinge 118 allows the lid component 108 to rotate relative to the arm component 106. In some embodiments, the second hinge 118 may include more than two protrusions. In some embodiments, the second hinge 118 may be spring-loaded such that the lid component 108 flips open and away from the opening 112 when the button 214 is depressed. This configuration may enable the user to quickly capture an image or video without needing to manually open and rotate the lid component 108 away from the opening 112. Some embodiments may include a first hinge 116 that is also spring-loaded.

Figure 4:
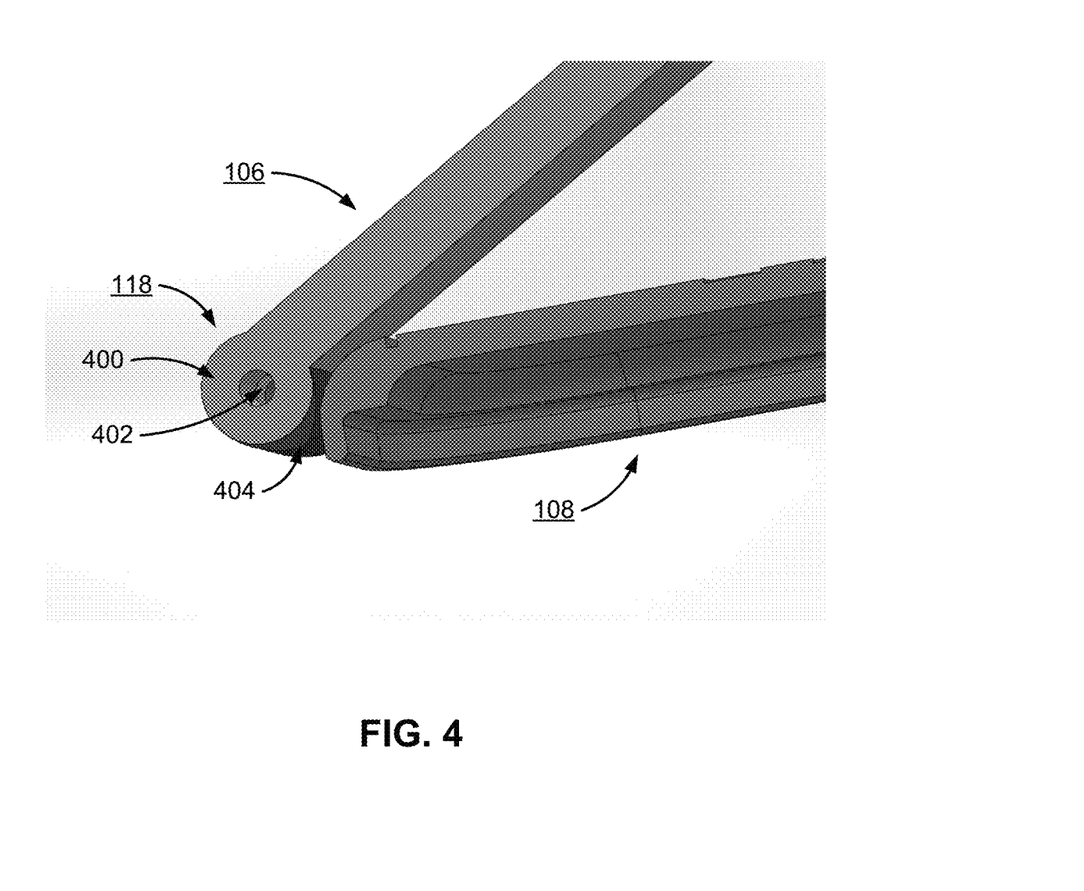
FIG. 4 illustrates a zoomed-in cross-sectional view of a hinge of the camera mount stand and cover, according to one example embodiment.

FIG. 4 illustrates a zoomed-in cross-sectional view of a hinge of the camera mount stand and cover, according to one example embodiment. A cross-sectional view of the second hinge 118 is illustrated in FIG. 4. The second end of the arm component 106 includes a leaf 400. In the embodiment of FIG. 4, the leaf 400 is a hollow cylinder and is configured to be positioned between the two protrusions of the knuckle 302. To enable the rotational motion of the second hinge 118, a pin 402 is inserted into the cylindrical bores of the knuckle 302 and into the center of the leaf 400. This configuration rotatably secures the arm component 106 and the lid component 108 together and allows rotation of the arm component 106 and the lid component 108 about the axis of the pin 402.

In the embodiment of FIG. 4, the leaf 400 includes an over-molded component 404. The over-molded component 404 is substantially triangular-shaped, wherein two edges of the triangle are tangent to the cylindrical shape of the leaf 400 and the third edge is rounded and protrudes from the leaf 400. This configuration of the over-molded component 404 limits the degree of rotation of the second hinge 118. When the lid component 108 is rotated to a threshold angle relative to the arm component 106, the over-molded component 404 secures the position of the lid component 108 and the arm component 106 at that threshold angle. In the embodiment of FIG. 4, the threshold angle is reached when the third edge of the leaf 400 fully contacts the lid component 108 and, due to the shape, prevents any further rotation of the second hinge 118. The over-molded component 404 may be composed of semi-rigid materials (e.g., rubber, plastics, etc.). Semi-rigid materials may allow the over-molded component to deform slightly, creating a friction lock in the hinge that may also be unlocked. While only the second hinge 118 is illustrated in FIG. 4, the first hinge 116 includes a leaf with an over-molded component that functions the same as the leaf 400 and the over-molded component 404, such that the housing body 104 and the arm component 106 are able to rotate relative to each other and become secured in a certain position when rotated to the threshold angle. This configuration allows the first hinge 116 and the second hinge 118 to each lock at a threshold angle that allows the camera mount 100 to act as a camera stand and support the camera 102 in the unfolded configuration. In some embodiments, the threshold angle for the first hinge 116 may vary from the threshold angle for the second hinge 118. In some embodiments, each over-molded component may be a uniform portion of the end of the arm component 104.

Figure 5:
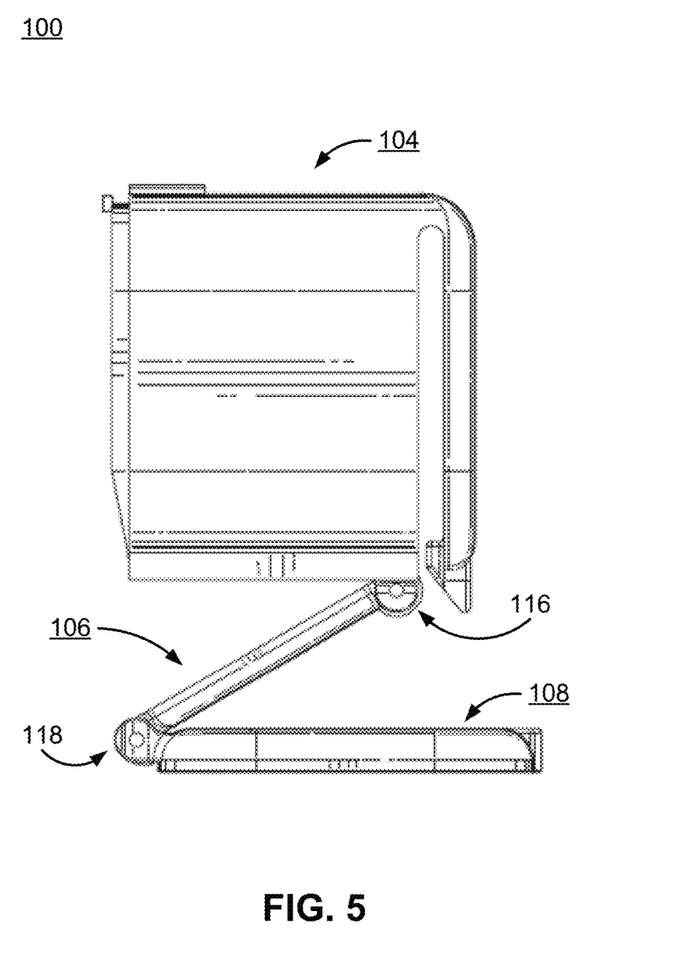
FIG. 5 illustrates a side view of the camera mount stand and cover, according to one example embodiment.

FIG. 5 illustrates a side view of the camera mount stand and cover, according to one example embodiment. As illustrated in FIG. 5, the camera mount 100 is in the unfolded configuration, such that the lid component 108 is acting as a base for the camera mount 100 and the arm component 106 is supporting the housing body 104. In the embodiment of FIG. 5, the lid component 108 is rotated away from the opening 110 until the second hinge 118 is rotated to the threshold angle, such that the lid component 108 and the arm component 108 are secured at the threshold angle as shown in FIG. 5. The arm component 106 is rotated away from the housing body 104 until the first hinge 116 is rotated to the threshold angle, such that the arm component 106 and the housing body 104 are secured at the threshold angle, as shown in FIG. 5. In the embodiment of FIG. 5, the threshold angles are pictured as approximately 30-45 degrees. In some embodiments, the shape and placement of the over-molded component on the leaf of the hinge may vary, creating a range of possible threshold angles for the hinge.

Additional Configuration Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for camera controllers as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A camera housing comprising:
a housing body comprising a cross-section that is substantially square-shaped with rounded corners, the housing body comprising an opening within a first face of the housing body and a cavity extending from the opening into the housing body, the cavity structured to at least partially enclose a camera such that when the camera is enclosed within the housing body, a lens of the camera is exposed within the opening;
an arm component, a first end of the arm component rotatably coupled to an edge of a bottom surface of the housing body via a first hinge, the first end of the arm component comprising a first over-molded component configured to, when the arm component is rotated a first threshold angle away from the bottom surface of the housing body, secure the arm component at an angle greater than or equal to the first threshold angle relative to the housing body; and
a lid component that is substantially square-shaped with rounded corners, the lid component rotatably coupled to a second end of the arm component opposite the first end via a second hinge, the second end of the arm component comprising a second over-molded component configured to, when the lid component is rotated a second threshold angle towards the arm component, secure the lid component at an angle greater than or equal to the second threshold angle relative to the arm component, the lid component further configured to reciprocally mate with the first face of the housing body such that the lid component covers the opening when the arm component is in a folded configuration.

2. The camera housing of claim 1, wherein, when the camera housing is configured in the folded configuration, the arm component abuts the bottom surface of the housing body, and the lid component is secured to the housing body and covers the opening and the lens of the camera.

3. The camera housing of claim 1, wherein, when the camera housing is configured in an unfolded configuration, the lid component acts as a base, and the arm component secures the housing body at a threshold height above the lid component.

4. The camera housing of claim 1, wherein the housing body comprises a plurality of securing protrusions that are located within the cavity, the plurality of securing protrusions configured to secure the camera when the camera is enclosed within the cavity.

5. The camera housing of claim 1, wherein the housing body comprises a second opening on a top surface of the housing body, the second opening exposing a plurality of control buttons on the camera when the camera is enclosed within the cavity.

6. The camera housing of claim 1, wherein the housing body comprises a latch that protrudes from a top edge of the opening.

7. The camera housing of claim 6, wherein the lid component comprises a notch that is configured to reciprocally mate with the latch in the folded configuration, such that the latch prevents the lid component from rotating away from the opening when the notch is mated with the latch.

8. The camera housing of claim 7, wherein the housing body comprises a button that is coupled to the latch, such that when the button is pressed, the latch releases the notch and allows the lid component to rotate away from the opening.

9. The camera housing of claim 1, wherein the bottom surface of the housing body comprises a recess that is configured to enclose the arm component when the camera housing is configured in the folded configuration.

10. The camera housing of claim 1, wherein the first threshold angle and the second threshold angle are substantially the same angle.

11. The camera housing of claim 1, wherein the first threshold angle is different from the second threshold angle.

12. The camera housing of claim 1, wherein the housing body comprises a mating interface on edges of the housing body surrounding the opening.

13. The camera housing of claim 12, wherein the lid component comprises a reciprocal mating interface along a perimeter of an inner surface of the lid component, the reciprocal mating interface configured to mate with the mating interface when the camera housing is in the folded configuration.

14. The camera housing of claim 1, wherein each over-molded component creates a friction lock when in contact with another surface.

15. The camera housing of claim 1, wherein the housing body further comprises a clip coupled to a back side of the housing body, the clip configured to couple the camera housing to an object.

16. A camera housing comprising:
a housing body structured to at least partially enclose a camera such that when the camera is enclosed within the housing body, a lens of the camera is exposed within a first face of the housing body;
an arm component, a first end of the arm component rotatably coupled to an edge of a bottom surface of the housing body via a first hinge, the first hinge configured to, when the arm component is rotated a first threshold angle away from the bottom surface of the housing body, secure the arm component at an angle greater than or equal to the first threshold angle relative to the housing body; and
a lid component that is rotatably coupled to a second end of the arm component opposite the first end via a second hinge, the second hinge configured to, when the lid component is rotated a second threshold angle towards the arm component, secure the lid component at an angle greater than or equal to the second threshold angle relative to the arm component.

17. The camera housing of claim 16, wherein each end of the arm component comprises an over-molded component that creates a friction lock when in contact with another surface.

18. The camera housing of claim 16, wherein the lid component is further configured to reciprocally mate with the first face of the housing body such that the lid component covers the lens of the camera when the arm component is in a folded configuration.

19. The camera housing of claim 18, wherein, when the camera housing is configured in the folded configuration, the arm component abuts the bottom surface of the housing body, and the lid component is secured to the housing body and covers the lens of the camera.

20. The camera housing of claim 16, wherein, when the camera housing is configured in an unfolded configuration, the lid component acts as a base, and the arm component secures the housing body at a threshold height above the lid component.

21. The camera housing of claim 18, wherein the camera housing further comprises:

a latch that protrudes from a top edge of the first face of the housing body;

a notch on the lid component that is configured to reciprocally mate with the latch in the folded configuration, such that the latch prevents the lid component from rotating away from the first face of the housing body when the notch is mated with the latch; and a button on the housing body that is coupled to the latch, such that when the button is pressed, the latch releases the notch and allows the lid component to rotate away from the first face of the housing body.

* * * * *